United States Patent
Pan et al.

(10) Patent No.: US 7,639,729 B2
(45) Date of Patent: Dec. 29, 2009

(54) CHANNEL ESTIMATION METHOD AND APPARATUS USING FAST FOURIER TRANSFORMS

(75) Inventors: Jung-Lin Pan, Selden, NY (US); John W. Haim, Baldwin, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1225 days.

(21) Appl. No.: 10/618,227

(22) Filed: Jul. 11, 2003

(65) Prior Publication Data

US 2004/0196782 A1 Oct. 7, 2004

Related U.S. Application Data

(60) Provisional application No. 60/460,852, filed on Apr. 4, 2003.

(51) Int. Cl.
*H04B 1/00* (2006.01)
(52) U.S. Cl. .................. 375/139; 375/260; 375/142; 375/219; 375/347
(58) Field of Classification Search ............ 375/260, 375/347, 130, 340, 222; 370/210, 203; 711/5
See application file for complete search history.

(56) References Cited

U.S. PATENT DOCUMENTS

| | | | | |
|---|---|---|---|---|
| 5,457,462 A * | 10/1995 | Mitsumoto et al. ........... 342/93 |
| 5,758,277 A * | 5/1998 | Hawkes ..................... 455/410 |
| 6,122,703 A * | 9/2000 | Nasserbakht ................... 711/5 |
| 6,192,068 B1 * | 2/2001 | Fattouche et al. ........... 375/130 |
| 6,320,897 B1 * | 11/2001 | Fattouche et al. ........... 375/130 |
| 6,683,904 B2 * | 1/2004 | Linder et al. ................ 375/139 |
| 6,826,240 B1 * | 11/2004 | Thomas et al. .............. 375/340 |
| 6,925,112 B1 * | 8/2005 | Morejon et al. ............. 375/222 |
| 6,985,749 B2 * | 1/2006 | Bannasch et al. ........... 455/506 |
| 7,130,361 B1 * | 10/2006 | Enderlein et al. ............ 375/324 |
| 7,139,320 B1 * | 11/2006 | Singh et al. ................. 375/260 |
| 7,266,168 B2 * | 9/2007 | Kwak et al. ................. 375/347 |
| 7,426,175 B2 * | 9/2008 | Zhuang et al. .............. 370/203 |
| 2004/0047284 A1 * | 3/2004 | Eidson ....................... 370/203 |
| 2004/0131010 A1 * | 7/2004 | Pan et al. .................... 370/210 |

OTHER PUBLICATIONS

Sklar (Digital Communications; Chapter 1, Section 1.6, pp. 30-33; Copyright 1988).*
Zepernick et al.; "Walsh-chirp sequences for wireless applications"; Journal of Telecommunications and Information Technology; Mar. 2001; Pahes 1-5.*

* cited by examiner

*Primary Examiner*—Sudhanshu C Pathak
(74) *Attorney, Agent, or Firm*—Volpe and Koenig, P.C.

(57) ABSTRACT

A low cost method and system for efficiently implementing channel estimation in a wireless communication system using any desired length of a fast Fourier transform (FFT) independent of burst type or signal structure. The hardware complexity required to perform the channel estimation to process a plurality of different burst types is reduced. Simple tail zero-padding is used when the length of FFT is extended to a desired length for more efficient computation.

4 Claims, 4 Drawing Sheets

CHANNEL ESTIMATION METHOD AND APPARATUS USING FAST FOURIER TRANSFORMS

CROSS REFERENCE TO RELATED APPLICATION(S)

This application claims priority from U.S. patent application No. 60/460,852, filed Apr. 4, 2003, which is incorporated by reference as if fully set forth.

FIELD OF INVENTION

This invention generally relates to channel estimation in wireless communications. In particular, the invention relates to low cost channel estimation using fast Fourier transform (FFT).

BACKGROUND

In code division multiple access (CDMA) communication systems, multiple communications may be simultaneously sent over a shared frequency spectrum. Each communication is distinguished by the code used to transmit the communication.

In one type of CDMA communication system, the shared spectrum is time divided into frames having a predetermined number of time slots, such as fifteen time slots. This system is referred to as a hybrid CDMA/time division multiple access (TDMA) communication systems. In another type of CDMA system, uplink and downlink communications are restricted to particular time slots. This system is referred to as a time division duplex (TDD) communication system.

In a typical TDD/CDMA communication system, communication data is sent using communication bursts. FIG. 1 illustrates a communication burst 16 having a midamble 20, a guard period 18 and two data fields 22, 24. The data fields 22, 24 carry the data of the communication burst 16. The guard period 18 separates the communication bursts 16 to allow for a difference in arrival times of bursts transmitted from different transmitters. The midamble 20 separates the two data fields 22, 24 and has a known training sequence used to estimate the channel that the communication burst 16 experiences. Using the estimated channel response, data from the data fields 22, 24 is recovered at a receiver. For the third generation partnership (3GPP) wideband CDMA (W-CDMA), based on the burst type, the basic midamble codes used to generate midamble bursts have differing lengths. To illustrate, the basic midamble code for burst type I has 456 chips while burst type II has 192 chips.

FFT is a powerful tool for efficient implementation of a wireless communications receiver. One drawback with FFT implementations is that they are limited to operating on fields with a predetermined length.

It is desirable to have a channel estimator using an FFT engine that has the capabilities to handle channel estimation for various types of bursts.

SUMMARY OF THE INVENTION

In a wireless communication system, channel estimation is performed by receiving reference signals having different lengths, processing the reference signals using a fast Fourier transform (FFT), and extending the FFT to a desired length L for more efficient computation. The FFT is extended to the length L to process a plurality of different burst types associated with the reference signals.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENT(S)

Although the preferred embodiments are described in conjunction with a preferred TDD/CDMA or TDMA/CDMA communication system, some aspects are also applicable to CDMA systems in general, including TD-SCDMA. However, the invention in its broad form is envisaged to be applicable to other systems of transmission also, without limitation.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

Figure 1:
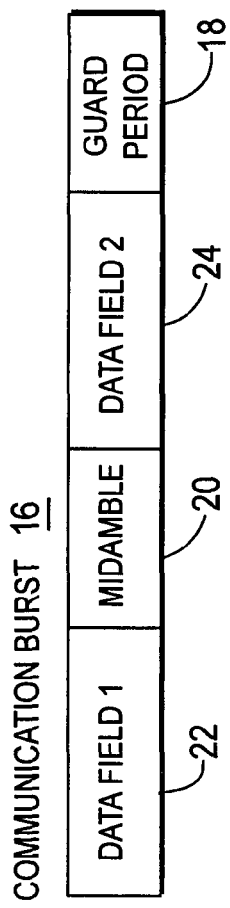
FIG. 1 is an illustration of a communication burst.
Figure 2:
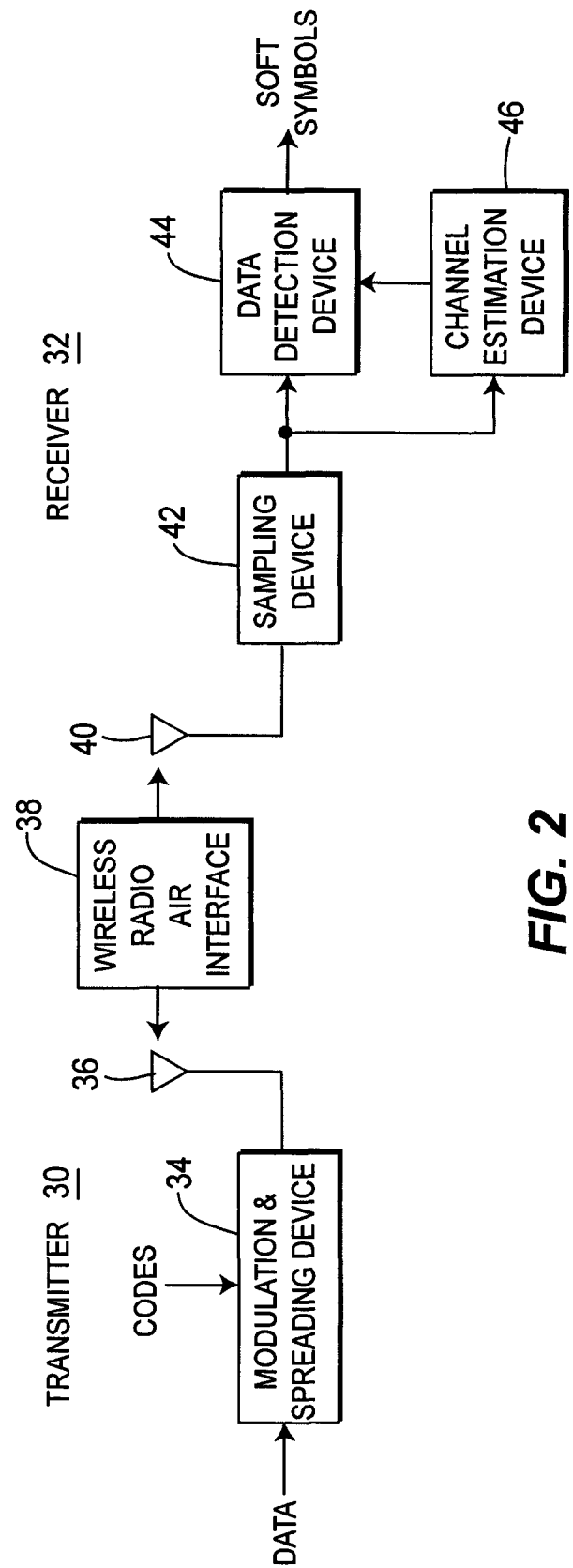
FIG. 2 is a simplified diagram of a transmitter and a receiver using channel estimation.

FIG. 2 illustrates an embodiment of channel estimation as used in a wireless communication system operating in accordance with the present invention. A transmitter 30 and a receiver 32 communicate with each other via a wireless radio air interface 38. The transmitter 30 may be located at a WTRU or at a base station. The receiver 32 may be located at the WTRU and/or the base station.

Data symbols to be transmitted to the receiver 32 are processed by a modulation and spreading device 34 at the transmitter 30. The modulation and spreading device 34 spreads the data with the codes and at a spreading factor(s) assigned to the communication(s) carrying the data. The communication(s) are radiated by an antenna 36 or antenna array of the transmitter 30 through the wireless radio interface 38.

At the receiver 32, the communication(s), possibly along with other transmitters' communications, are received at an antenna 40 or antenna array of the transmitter 30. The received signal is sampled by a sampling device 42, such as at the chip rate or at a multiple of the chip rate, to produce a received vector. The received vector is processed by a channel estimation device 46 to estimate the channel impulse responses for the received communications. The channel estimation device 46 uses a training sequence in the received communication to estimate the channel experienced by each communication. A data detection device 44, such as a joint detection device, uses the code(s) of the received communication(s) and the estimated impulse response(s) to estimate soft symbols of the spread data.

The following is a description of an exemplary process for channel estimation with a single length FFT.

For channel estimation, the received signal r can be expressed as the circular convolution of two sequences, the midamble sequence, m and the channel impulse response, h by $$\underline{r} = \underline{m} \circledx \underline{h} \quad \text{Equation (1)}$$

where $\circledx$ is defined as the circular convolution operator.

In frequency domain, the circular convolution of two signals becomes a product of frequency responses of two signals, and the frequency response of the resulting output signal becomes $$\underline{R} = \underline{M} \cdot \underline{H} \quad \text{Equation (2)}$$

where $\underline{R}$ is the FFT of time domain signal $\underline{r}$, $\underline{M}$ is the FFT of midamble sequence $\underline{m}$ and $\underline{H}$ is the FFT of channel impulse response $\underline{h}$. In short they are expressed by $\underline{R}=F(\underline{r})$, $\underline{M}=F(\underline{m})$ and $\underline{H}=F(\underline{h})$ where $F()$ is defined as the operator for forward FFT and $F^{-1}()$ is defined as the operator for inverse FFT. The "underscore" indicates that the signal is a vector.

To obtain the estimated channel response, first $\underline{H}$ is calculated by $$\underline{H} = \frac{\underline{R}}{\underline{M}} \quad \text{Equation (3)}$$

where $\underline{R}/\underline{M}$ is the element-to-element division of the corresponding two FFT sequences. The channel impulse response can be estimated by inverse FFT of $\underline{H}$ by $$\underline{h} = F^{-1}(\underline{H}) \quad \text{Equation (4)}$$

The whole process can be summarized in one single equation by $$\underline{h} = F^{-1}(F(\underline{r})/F(\underline{m})) \quad \text{Equation (5)}$$

$F(\underline{r})/F(\underline{m})$ in Equation (5) denotes the element-to-element division of FFT sequences $F(\underline{r})$ and $F(\underline{m})$. Note that the forward and inverse FFT are exchangeable in the following form as illustrated for vector $\underline{x}$:

$$F^{-1}(\underline{x}) = \frac{1}{P}(F(\underline{x}^*))^* \quad \text{Equation (6)}$$

where P is the length of FFT.

To enable a single-length FFT, the FFT operations used for channel estimation as shown in Equation (5) should be extended to a longer desired length. In the preferred embodiment, the length of extended FFT should be at least long enough to account for all burst types including burst types 1, 2 and 3 so that FFTs in Equation (5) will not depend on the burst type, although in other systems and implementations the length may vary. To extend a FFT to any longer proper length L, a chirp transform algorithm (CTA) is used to compute $F(\underline{r})$ and $F(\underline{m})$ in Equation (5) by an extended FFT. The inverse FFT (IFFT) for $F^{-1}(\underline{H})$ in Equation (4) can be implemented by the forward FFT. This can be done by performing FFT on the conjugate signal of $\underline{H}$ and then taking conjugate on the resulting FFT output and scaling it properly as shown in Equation (6). CTA is used to compute $F(\underline{H}^*)$ by extended FFT.

The procedure for extended FFT and efficient channel estimation is described as follows:

There are two stages to be performed. The first stage calculates $F(\underline{r})$ and $F(\underline{m})$ by extended FFT and divides them element-to-element. The second stage computes $F(\underline{H}^*)$ by the extended FFT and then conjugates and scales the result. For the following discussions, let P denote the original length of FFT and L be the extended length of FFT using tail zero-padding. The original lengths of FFT for example, are P=456 and P=192 for burst types 1/3 and 2 respectively.

Figure 3:
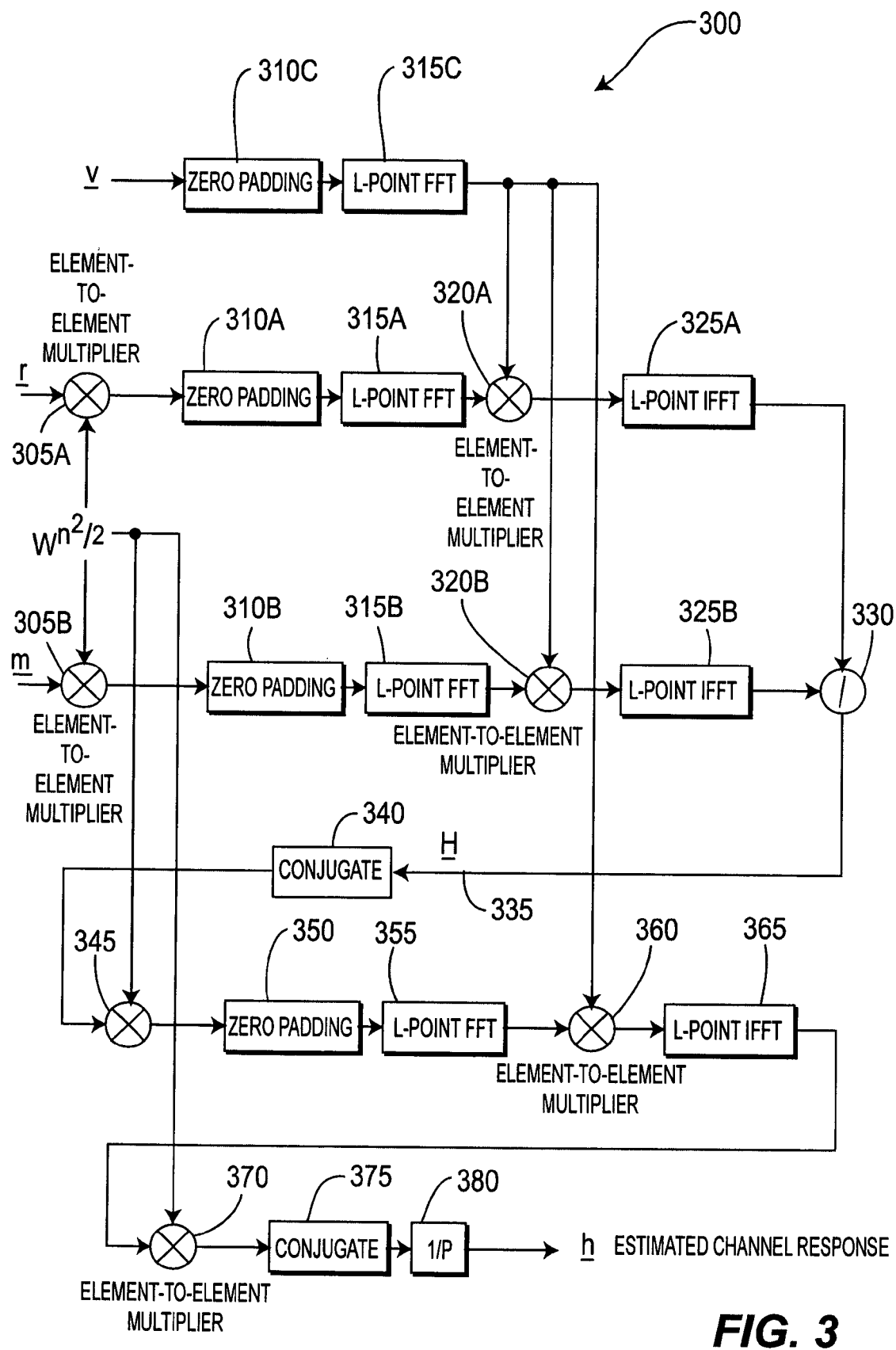
FIG. 3 is a system block diagram illustrating the process for implementing channel estimation in accordance with a preferred embodiment of the present invention.

FIG. 3 is a block diagram of a system 300 including means for performing stages 1 and 2. For stage 1, an element-to-element multipliers 305A, 305B multiply the sequences $\underline{m}$ and $\underline{r}$ by chirp waveform $W^{n^2/2}$ for n=0, 1, 2, ..., P−1 where P=456 for burst types 1/3 or P=192 for burst type 2 and $$W = e^{-j\frac{2\pi}{P}}.$$

In this context, chirp waveform is referred to as the waveform generated by $$W^{\frac{n^2}{2}},$$

n=0, 1, 2, ..., P−1. The resulting sequences are denoted as $\underline{m}_W$ and $\underline{r}_W$ respectively. A chirp sequence $\underline{v}$ is created such that $\underline{v} = W^{-(n-P+1)^2/2}$ for n=0, 1, 2, ..., 2P−2. Chirp sequence is referred to the modified sequence based on a chirp waveform generated by $$W^{-\frac{(n-P+1)^2}{2}},$$

n=0, 1, 2, ..., 2P−2. Chirp sequence is different from chirp waveform with a shift in index n and with a longer waveform length. The chirp transform algorithm refers to the entire process that performs the original FFT with extended FFT, in which the chirp waveform and chirp sequence are used to transform signals in a proper format suitable for processing.

The sequences $\underline{m}_W$, $\underline{r}_W$ and $\underline{v}$ are processed by zero padding 310A, 310B, 310C in the tail until the length of the sequences achieves L. Denote the resulting sequences as $\underline{m}_{W,Z}$, $\underline{r}_{W,Z}$ and $\underline{v}_Z$. L-point FFTs 315,A, 315B, 315C are implemented on $\underline{m}_{W,Z}$, $\underline{r}_{W,Z}$ and $\underline{v}_Z$ each such that $F(\underline{m}_{W,Z})$, $F(\underline{r}_{W,Z})$ and $F(\underline{v}_Z)$. Element-to-element multipliers 320A, 320B multiply the FFT of $\underline{m}_{W,Z}$ and $\underline{r}_{W,Z}$ each with FFT of $\underline{v}_Z$ such that the products are $F(\underline{m}_{W,Z}) \cdot F(\underline{v}_Z)$ and $F(\underline{r}_{W,Z}) \cdot F(\underline{v}_Z)$ respectively. L-point inverse FFTs (IFFTs) 325A, 325B are implemented on the outputs of multipliers 320A, 320B such that $F^{-1}(F(\underline{m}_{W,Z}) \cdot F(\underline{v}_Z))$ and $F^{-1}(F(\underline{r}_{W,Z}) \cdot F(\underline{v}_Z))$ respectively. An element-to-element divider 330 divides the outputs of L-point IFFTs 325A, 325B and denotes the result as $\underline{H}$ 335 such that $$\underline{H} = \frac{F^{-1}(F(\underline{r}_{W,Z}) \cdot F(\underline{v}_Z))}{F^{-1}(F(\underline{m}_{W,Z}) \cdot F(\underline{v}_Z))}.$$

Note that only the first P elements of sequence $\underline{H}$ are computed and used.

Still referring to FIG. 3, for stage 2, conjugate device 340 conjugates the sequence $\underline{H}$ that was obtained in the final step of stage 1. Element-to-element multiplier 345 multiplies the conjugate sequence $\underline{H}^*$ by chirp waveform $W^{n^2/2}$ for n=0, 1, 2, ..., P–1. The result is denoted as $\underline{H}^*_W$. Zero padding 350 zero pads the conjugate sequences $\underline{H}^*_W$ in the tail until the length of the sequence achieves length L. The resulting sequence is denoted as $\underline{H}^*_{W,Z}$. An L-point FFT 355 is performed on $\underline{H}^*_{W,Z}$. Element-to-element multiplier 360 multiplies the FFT of $\underline{H}^*_{W,Z}$ by FFT of zero-padded chirp sequence $\underline{v}_Z$ such that the product is $F(\underline{H}^*_{W,Z}) \cdot F(\underline{v}_Z)$. An L-point IFFT 365 is implemented on the output of multiplier 360 resulting $F(\underline{H}^*_{W,Z}) \cdot F(\underline{v}_Z)$. Element-to-element multiplier 370 multiplies the sequence $F(\underline{H}^*_{W,Z}) \cdot F(\underline{v}_Z)$ by chirp waveform $W^{n^2/2}$ for n=0, 1, 2, ..., P–1. Note that only the first P elements are calculated and used. The output of multiplier 370 is conjugated by conjugate device 375 and the result is scaled by scaling device 380 by factor $$\frac{1}{P}$$

to obtain the estimated channel response.

Figure 4:
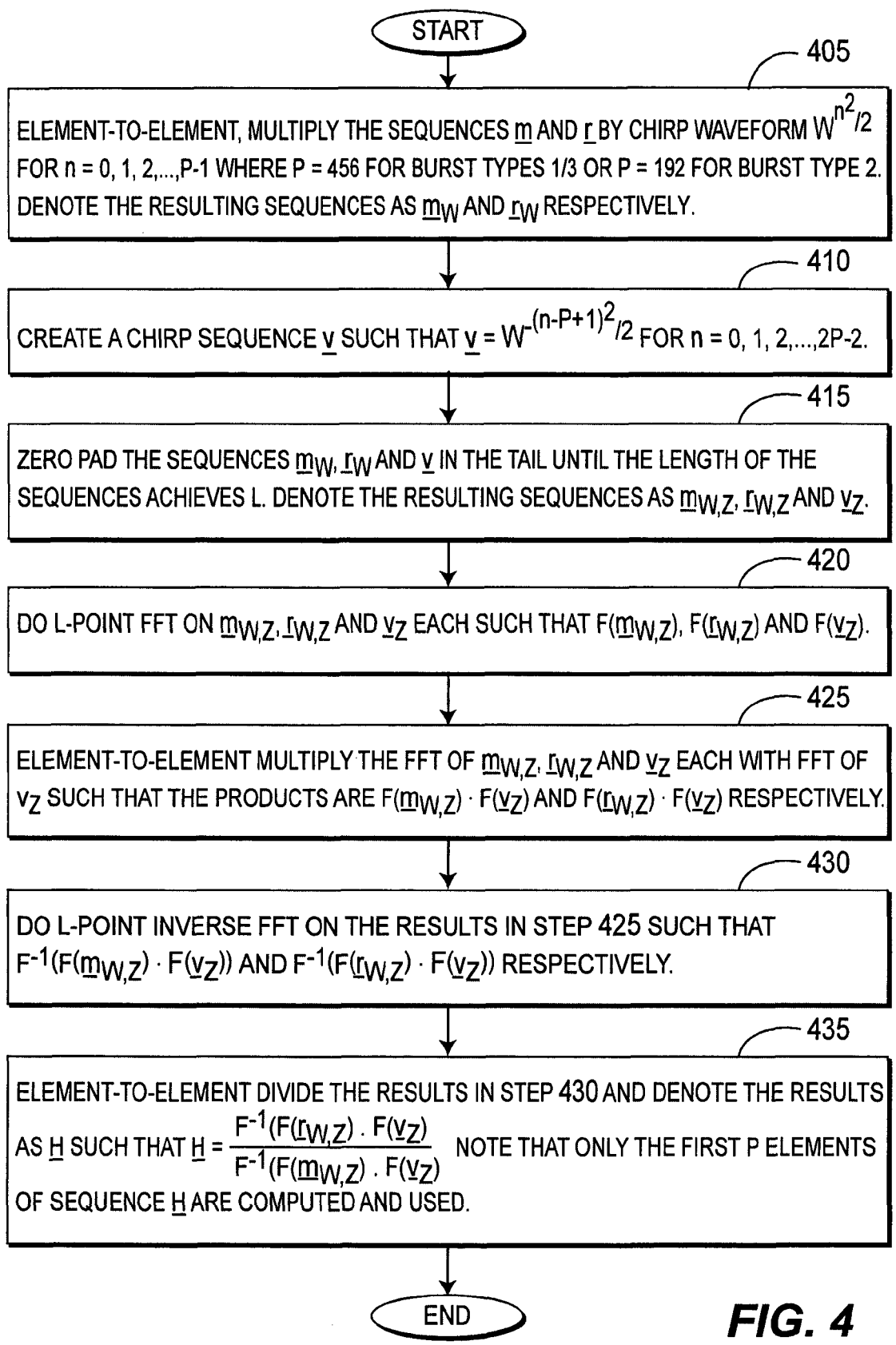
FIG. 4 is a flow chart illustrating the process to calculate F($\underline{r}$) and F($\underline{m}$) by extended FFT and divide them element-to-element.

Referring to FIG. 4, the procedure for stage 1 by the extended FFT is described as follows:

In step 405, element-to-element, multiply the sequences $\underline{m}$ and $\underline{r}$ by chirp waveform $W^{n^2/2}$ for n=0, 1, 2, ..., P–1 where P=456 for burst types 1/3 or P=192 for burst type 2. Denote the resulting sequences as $\underline{m}_W$ and $\underline{r}_W$ respectively.

In step 410, create a chirp sequence $\underline{v}$ such that $\underline{v}=W^{-(n-P+1)^2/2}$ for n=0, 1, 2, ..., 2P–2.

In step 415, zero pad the sequences $\underline{m}_W$, $\underline{r}_W$ and $\underline{v}$ in the tail until the length of the sequences achieves L. Denote the resulting sequences as $\underline{m}_{W,Z}$, $\underline{r}_{W,Z}$ and $\underline{v}_Z$.

In step 420, perform L-point FFT on $\underline{m}_{W,Z}$, $\underline{r}_{W,Z}$ and $\underline{v}_Z$ each such that $F(\underline{m}_{W,Z})$, $F(\underline{r}_{W,Z})$ and $F(\underline{v}_Z)$.

In step 425, element-to-element multiply the FFT of $\underline{m}_{W,Z}$ and $\underline{r}_{W,Z}$ each with FFT of $\underline{v}_Z$ such that the products are $F(\underline{m}_{W,Z}) \cdot F(\underline{v}_Z)$ and $F(\underline{r}_{W,Z}) \cdot F(\underline{v}_Z)$ respectively.

In step 430, an L-point inverse FFT is performed on $F(\underline{m}_{W,Z}) \cdot F(\underline{v}_Z)$ and $F(\underline{r}_{W,Z}) \cdot F(\underline{v}_Z)$ such that $F^{-1}(F(\underline{m}_{W,Z}) \cdot F(\underline{v}_Z))$ and $F^{-1}(F(\underline{r}_{W,Z}) \cdot F(\underline{v}_Z))$ respectively.

In step 435, element-to-element divide $F^{-1}(F(\underline{m}_{W,Z}) \cdot F(\underline{v}_Z))$ by $F^{-1}(F(\underline{r}_{W,Z}) \cdot F(\underline{v}_Z))$ and denote the result as $\underline{H}$ such that $$\underline{H} = \frac{F^{-1}(F(\underline{r}_{W,Z}) \cdot F(\underline{v}_Z))}{F^{-1}(F(\underline{m}_{W,Z}) \cdot F(\underline{v}_Z))}.$$

Note that only the first P elements of sequence $\underline{H}$ are computed and used.

Note that basic midamble code is fixed in a cell and the chirp sequence is constant once it is generated, the computation of $F^{-1}(F(\underline{m}_{W,Z}) \cdot F(\underline{v}_Z))$ can be pre-computed once and for all and stored for each cell.

Figure 5:
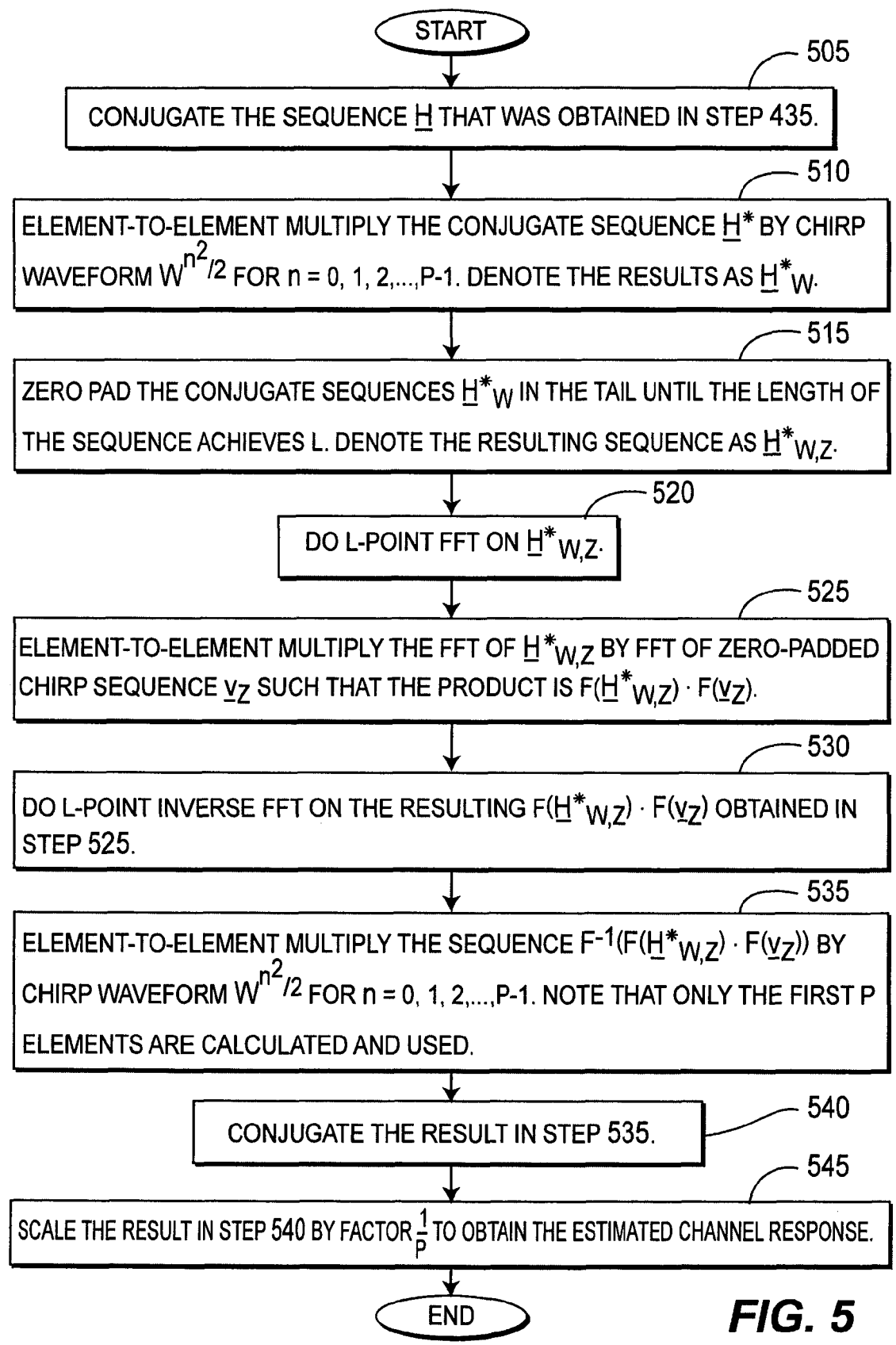
FIG. 5 is a flow chart illustrating the process to compute F($\underline{H}$*) by the extended FFT and then conjugate and scale the result.

Referring to FIG. 5, the procedure for stage 2 is to compute $F(\underline{H}^*)$ by extended FFT and conjugate and scale the result is described as follows:

In step 505, conjugate the sequence $\underline{H}$ that was obtained in the final step of stage 1 (step 435).

In step 510, element-to-element multiply the conjugate sequence $\underline{H}^*$ by chirp waveform $W^{n^2/2}$ for n=0, 1, 2, ..., P–1. Denote the result as $\underline{H}^*_W$.

In step 515, zero pad the conjugate sequences $\underline{H}^*_W$ in the tail until the length of the sequence achieves L. Denote the resulting sequence as $\underline{H}^*_{W,Z}$.

In step 520, perform L-point FFT on $\underline{H}^*_{W,Z}$.

In step 525, element-to-element multiply the FFT of $\underline{H}^*_{W,Z}$ by FFT of zero-padded chirp sequence $\underline{v}_Z$ such that the product is $F(\underline{H}^*_{W,Z}) \cdot F(\underline{v}_Z)$.

In step 530, perform L-point inverse FFT on $F(\underline{H}^*_{W,Z}) \cdot F(\underline{v}_Z)$.

In step 535, element-to-element multiply the sequence $F^{-1}(F(\underline{H}^*_{W,Z}) \cdot F(\underline{v}_Z))$ by chirp waveform $W^{n^2/2}$ for N=0, 1, 2, ..., P–1. Note that only the first P elements are calculated and used.

In step 540, conjugate the result in step 535.

In step 545, scale the result in step 540 by factor $$\frac{1}{P}$$

to obtain the estimated channel response.

The above method of extended FFT using simple zero padding for channel estimation is very cost efficient in terms of hardware complexity. High computational efficiency is also achievable when the extended FFT length is optimized for specific computing algorithms such as a prime factor algorithm (PFA) or Radix-2 algorithm.

While this invention has been particularly shown and described with reference to preferred embodiments, it will be understood by those skilled in the art that various changes in form and details may be made therein without departing from the scope of the invention described hereinabove.

What is claimed is:

1. A method of performing channel estimation, the method comprising:
   receiving a time domain signal sequence $\underline{r}$ and a midamble sequence $\underline{m}$;
   multiplying, element-to-element, the sequences $\underline{m}$ and $\underline{r}$ by a chirp waveform, the chirp waveform being based on the length of a fast Fourier transform (FFT) and denoting the resulting sequences as $\underline{m}_w$ and $\underline{r}_w$ respectively, generating a chirp sequence $\underline{v}$ based on the chirp waveform; and
   performing channel estimation based on the resulting sequences $\underline{m}_w$, $\underline{r}_w$, the chirp waveform and chirp sequence $\underline{v}$,
   wherein the chirp waveform is $W^{n^2/2}$ for n=0, 1, 2, ..., P–1 where P=456 for burst types 1/3 or P=192 for burst type 2, and $$W = e^{-j\frac{2\pi}{P}}$$

and wherein the chirp sequence $\underline{v}=W^{-(n-P+1)^2/2}$ for n=0, 1, 2, ..., 2P–2.

2. A receiver for performing channel estimation, the receiver comprising:
   a receiving component configured to receive a time domain signal $\underline{r}$ and a midamble sequence $\underline{m}$,
   a component configured multiply, element-to-element, the sequences $\underline{m}$ and $\underline{r}$ by a chirp waveform, the chirp waveform being based on the length of a fast Fourier transform (FFT) and denote the resulting sequences as $\underline{m}_w$ and $\underline{r}_w$ respectively;
   a generating component configured to generate a chirp sequence $\underline{v}$ based on the chirp waveform; and
   a channel estimation component configured to estimate a channel based on the resulting sequences $\underline{m}_w$, $\underline{r}_w$, the chirp waveform and chirp sequence $\underline{v}$;

wherein the chirp waveform is $W^{n^2/2}$ for n=0, 1, 2, ..., P−1 where P=456 for burst types 1/3 or P=192 for burst type 2, and $$W = e^{-j\frac{2\pi}{P}}$$

and wherein the chirp sequence $\underline{v} = W^{-(n-P+1)^2/2}$ for n=0, 1, 2, ..., 2P−2.

3. A wireless transmit/receive unit (WTRU) for performing channel estimation, the WTRU comprising:
   a receiving component configured to receive a time domain signal $\underline{r}$ and a midamble sequence $\underline{m}$,
   a component configured multiply, element-to-element, the sequences $\underline{m}$ and $\underline{r}$ by a chirp waveform, the chirp waveform being based on the length of a fast Fourier transform (FFT) and denote the resulting sequences as $\underline{m}_w$ and $\underline{r}_w$ respectively;
   a generating component configured to generate a chirp sequence $\underline{v}$ based on the chirp waveform; and
   a channel estimation component configured to estimate a channel based on the resulting sequences $\underline{m}_w$, $\underline{r}_w$, the chirp waveform and chirp sequence $\underline{v}$;
   wherein the chirp waveform is $W^{n^2/2}$ for n=0, 1, 2, ..., P−1 where P=456 for burst types 1/3 or P=192 for burst type 2, and $$W = e^{-j\frac{2\pi}{P}}$$

and wherein the chirp sequence $\underline{v} = W^{-(n-P+1)^2/2}$ for n=0, 1, 2, ..., 2P−2.

4. A base station (BS) for performing channel estimation, the BS comprising:
   a receiving component configured to receive a time domain signal $\underline{r}$ and a midamble sequence $\underline{m}$,
   a component configured multiply, element-to-element, the sequences $\underline{m}$ and $\underline{r}$ by a chirp waveform, the chirp waveform being based on the length of a fast Fourier transform (FFT) and denote the resulting sequences as $\underline{m}_w$ and $\underline{r}_w$ respectively;
   a generating component configured to generate a chirp sequence $\underline{v}$ based on the chirp waveform; and
   a channel estimation component configured to estimate a channel based on the resulting sequences $\underline{m}_w$, $\underline{r}_w$, the chirp waveform and chirp sequence $\underline{v}$;
   wherein the chirp waveform is $W^{n^2/2}$ for n=0, 1, 2, ..., P−1 where P=456 for burst types 1/3 or P=192 for burst type 2, and $$W = e^{-j\frac{2\pi}{P}}$$

and wherein the chirp sequence $\underline{v} = W^{-(n-P+1)^2/2}$ for n=0, 1, 2, ..., 2P−2.

* * * * *

UNITED STATES PATENT AND TRADEMARK OFFICE
CERTIFICATE OF CORRECTION

PATENT NO.        : 7,639,729 B2
APPLICATION NO. : 10/618227
DATED             : December 29, 2009
INVENTOR(S)       : Pan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1893 days.

Signed and Sealed this

Ninth Day of November, 2010

David J. Kappos
*Director of the United States Patent and Trademark Office*